United States Patent [19]

Moyer et al.

[11] Patent Number: 4,927,610

[45] Date of Patent: May 22, 1990

[54] METHOD FOR EXTRACTING COPPER, SILVER AND RELATED METALS

[75] Inventors: Bruce A. Moyer, Oak Ridge; W. J. McDowell, Knoxville, both of Tenn.

[73] Assignee: The United States of America as represented by the United States Department of Energy, Washington, D.C.

[21] Appl. No.: 214,814

[22] Filed: Jul. 1, 1988

Related U.S. Application Data

[63] Continuation-in-part of Ser. No. 111,490, Oct. 23, 1987, abandoned.

[51] Int. Cl.$^5$ ............................................. B01D 11/00
[52] U.S. Cl. ............................ 423/24; 423/DIG. 14; 210/688; 210/912
[58] Field of Search .......... 75/118 R, 101 R, 101 BE, 75/117; 423/24, 27, DIG. 14; 540/467; 210/688, 912

[56] References Cited

U.S. PATENT DOCUMENTS 3,966,766  6/1976  Lehn ................................... 540/467
4,156,683  5/1979  Lehn ................................... 540/467

OTHER PUBLICATIONS

Ritcey et al., "Solvent Extraction, Principles and Applications to Process Metallurgy", Elsevier Scientific Publishing Company, Amsterdam-Oxford-New York, 1979.

Primary Examiner—Robert L. Stoll
Attorney, Agent, or Firm—Katherine P. Lovingood; Stephen D. Hamel; William R. Moser

[57] ABSTRACT

A process for selectively extracting precious metals such as silver and gold concurrent with copper extraction from aqueous solutions containing the same. The process utilizes tetrathiamacrocycles and high molecular weight organic acids that exhibit a synergistic relationship when complexing with certain metal ions thereby removing them from ore leach solutions.

3 Claims, No Drawings

METHOD FOR EXTRACTING COPPER, SILVER AND RELATED METALS

This is a continuation-in-part of application Ser. No. 111,490, filed 10/23/87, now abandoned.

This invention relates to a process for selectively extracting copper and silver and other metals from ore or other appropriate metal sources and was developed pursuant to a contract with the U.S. Department of Energy.

BACKGROUND

The recovery of copper by smelting has been the practice in the industry for a long time but more recently copper ores, residues, and other metal sources have also been subjected to solvent (or liquid-liquid) extraction methods for recovery of the metals. The ore, for example, is leached with sulfuric acid and the dissolved metal ions are transferred to an organic phase containing extraction reagents or extractants. This organic solution is also called the solvent in hydrometallurgy. The extractants that are now used are not very selective for copper over iron, the latter being a major contaminent in copper ore.

A number of reagents have been used to extract copper and other metals from aqueous solutions. The one most closely related to that of this invention is 1,4,8,11-tetrathiacyclotetradecane (TT14C4) used in combination with organophilic anions introduced to the metal in an aqueous phase. The metal is then transferred to the organic extractant phase with the anions as a salt; however, this method is not practical because of the expense of the organophilic anions. Therefore, there is a need to provide a process for removing copper and silver and other metals from one and other metal sources that is selective, simple, inexpensive and efficient.

SUMMARY OF THE INVENTION

In view of the above need, it is an object of this invention to provide a process for removing copper and silver and other metals from solutions containing the same without requiring the use of expensive organophilic anions.

Another object of the invention is to provide a process for removing copper and silver and other metal from ore leachate or other significant metal sources without requiring the coextraction of aqueous anions.

It is another object of this invention to provide an efficient process for removing copper and silver and other metals from ore or other significant metal sources.

A further object of this invention is to effect the selective solvent extraction of copper and silver and related metals over other metals in a leachate solution. Other objects of this invention will become obvious to persons skilled in the art upon study of the specifications and appended claims.

To achieve the above objects, the invention is a process for removing copper and silver and related metals from ore leachate or metal bearing aqueous solutions by solvent extraction using a combination of two reagents that have a synergistic effect when removing the metals from the metal bearing leachate solution. The extracting reagents are a tetrathiamacrocycle and a branched organosulfonic acid having a molecular weight of about 300 or more. The preferred macrocycles are 1,5,9,13-tetrathiacyclohexadecane (TT16C4) and 1,4,8,11-tetrathiacyclotetradecane (TT14C4). The preferred organic acid is didodecylnaphthalene sulfonic acid (HDDNS).

DETAILED DESCRIPTION OF THE PREFERRED EMBODIMENT

The process of this invention of extraction of copper and silver and other metals from ore or metal leach solutions includes a solvent extraction procedure using a solution of an acidic high molecular weight organic compounds which is a cation exchanger (ie., an alkyl- or aryl-substituted organic acid with a molecular weight of about 300 or more) in an inert diluent such as toluene and a second organic compound, referred to herein as a synergist, having a high affinity for copper, silver, gold and other related valuable metals.

Work done on the tetrathiamacrocycles and explained in the examples of this application display that they have a high affinity for copper and silver. Comparisons that are found in the literature on thia-ethers extractants, whether macrocyclic or not, show that they extract copper, silver, gold, mercury, palladium and lead. Therefore, it can be concluded that the tetrathiamacrocycles of this application would also extract the above-mentioned metals.

A suitable organosulfonic acid would be soluble in a suitable organic diluent in concentrations from 0.01 to 0.5M. Some examples of organic diluents are toluene, dimethyl benzene, dodecane and kerosene. There should be low distribution from the organic solution to water—not more than 1 part in $10^3$ of the sulfonic acid distributed in an equal volume, two-phase equilibration. The solubility of the corresponding salts and adducts in such organic diluents should be in the same molarity range as for the sulfonic acid itself. The distribution of the salts and adducts from the organic diluent phase to the aqueous phase should be not more than $10^{-3}$ in a two phase equilibration. The acid should be chemically stable in the presence of the aqueous solutions with which it is to be equilibrated. The aqueous solution is usually dilute mineral acid, mineral acid salt or alkali hydroxide solutions. There must be a sufficient degree of solubility that neither the salts nor their adducts crystallize or form a third phase.

Experience with a variety of solvent extraction systems has established that the needed properties are provided by a compound of molecular weight of 300 or greater. Examples include a benzene ring to which the sulfonic acid and one or more branched alkyl groups are attached, a naphthalene group to which the sulfonic acid and one or more branched alkyl groups are attached and an alkyl chain to which the sulfonic acid and one or more branched alkyl groups are attached.

A branched alkyl structure usually confers the properties of good organic-phase solubility, low aqueous-phase distribution, and non-crystallization of the compound. As an example, di-n-dodecylnaphthalene sulfonic acid is a crystalline solid, soluble in toluene to the extent of only 0.01M while di-(branched)-dodecylnaphthalene sulfonic acid is a viscous liquid, infinitely miscible with toluene and a variety of other organic liquids.

In general, no particular kind of branching appears to be critical except that multiple branching is probably better than single branching on the benzene or naphthalene nucleus and more than one branched substituent is probably better than a single highly branched substituent. Optimizing the type branching needed in a particular application involves testing ordinarily undertaken by persons skilled in the art. The metal cations ($M^{2+}$)

are extracted from an ore leachate aqueous phase, for example, by being exchanged for protons of the organic acid (HA) which is in the organic phase. The result is a metal salt ($MA_O$) in the organic phase and protons ($H^+$) in the aqueous phase. HDDNS is a suitable cation exchanger, and useful synergists can be selected from members of the class of macrocyclic sulfur-containing organic compounds, typically TT16C4 or TT14C4. The solvents that can be made from these cation exchangers and synergists vary widely in composition and can contain any ratio of synergists to cation exchanger provided both are present, can contain any possible concentration of either synergists or cation exchanger, and may use any type of diluent or diluent-modifier combination where the modifier may be one or more additional solvent components desired to effect a modification in the solvent properties, such modifiers being known to persons of ordinary skill in the art.

To extract metals using the solvents described, the solvent is contacted directly with an immiscible aqueous solution containing the desired metals which results in the formation of an organic-phase metal complex with the organic substituents. This complex must be dissociated in order to remove the metals from the solvents; this can be done using common stripping practices in extraction technology such as reversing the extraction process by removing the metal using an aqueous stripping solution or the direct reduction of the metal in the solvent resulting in precipitation of the base metal. In all of these procedures the extraction reagents remain in the organic phase so that the reagents plus diluent can be reused to extract more metal.

EXAMPLE 1

To demonstrate the usefulness of this invention, four synergistic extraction combinations were performed. Referring to Table 1 which follows, Sample 1 consisted of 0.1M HDDNS and 0.05M TT14C4 in toluene as diluent. Sample 2 contained 0.1M HDDNS and 0.05M TT16C4 in toluene as diluent. Sample 3 contained 0.001M HDDNS and 0.001M TT14C4 in toluene as diluent. And Sample 4 contained 0.0001M HDDNS and 0.0001M TT16C in toluene as diluent. Using all of these sample solvent extraction mixtures in separate tests, liquid-liquid contact was made by gently dispersing equal volumes of solvent and metal-containing sulfuric acid in a closed container at room temperature between 22° and 25° C. for 15 to 30 minutes which was sufficient time to bring the extraction to equilibrium with an end-over-end tumbling motion. At the end of this time, the container was brought to rest for several minutes to allow the phase to coalesce. The example procedures were selected due to the experimental procedures available and do not necessarily represent the only or best way to perform the extraction and other methods known to persons of ordinary skill in the art can be used.

Tables 1 and 2 below indicate that a significant extraction of $Cu^{2+}$ and $Ag^+$ may be realized when compared with the independent extractions using either HDDNS or one of the tetrathiamacrocycles. Neither TT14C4 nor TT16C4 alone is able to extract copper or silver from sulfuric acid as seen by the distribution coefficient set forth in Table 1. Whereas HDDNS exhibited some non-selective extraction of $Cu^{2+}$ and $Ag^+$, this ability is made selective and greatly enhanced by the addition of either of the macrocycles. Tables 1 and 2 also indicate that increasing the acidity will lower the coefficient of distribution suggesting that extracted metals may be removed from the metal-containing solvents by subsequently contacting the solvents with an aqueous solution containing a significantly higher concentration of sulfuric acid. This process of removing the metal from the solvent was confirmed by first extracting a small concentration of copper from 1.5M sulfuric acid solution using Sample 1 and subsequently stripping the resulting copper-containing solvent with 6M sulphuric acid. The coefficient of distribution decreased from 100 in the extraction step to 0.232 in the stripping step indicating that a majority of the $Cu^{2+}$ had been subsequently removed from the solvent.

TABLE 1

| Solvent Extraction of $Cu^{2+}$ Ion* | | | | | |
|---|---|---|---|---|---|
| Initial HDDNS Aqueous Conc. TT16C4 [$H_2SO_4$] | 0.1 M HDDNS D | 0.05 M TT14C4 D | 0.05 M TT16C4 D | Example 1 0.1 M HDDNS + 0.05 M TT14C4 D | Example 2 0.1 M HDDNS + 0.05 M TT16C4 D |
| 0.075 | 20 | <0.001 | <0.001 | 3700 | 150 |
| 0.30 | 1.3 | " | " | 960 | 13 |
| 3.0 | 0.22 | " | " | 21 | 1.3 |

*Conditions: 15-30 min. equilibration time; 1:1 phase ratio; room temperature; trace $Cu^{2+}$ level
The distribution coefficient D is defined as the concentration of metal in the solvent divided by the concentration of metal in the contacted aqueous phase at equilibrium:

$$D = \frac{[M]_{org}}{[M]_{aq}}$$

The percent of the initial metal extracted from the aqueous phase at a 1:1 phase ratio as given by:

$$\% \text{ extracted} = \frac{D}{D+1} \times 100$$

TABLE 2

| Solvent Extraction of $Ag^+$ Ion* | | | | | |
|---|---|---|---|---|---|
| Initial HDDNS Aqueous Conc. TT16C4 [$H_2SO_4$] | 0.0001 M HDDNS D | 0.0001 M TT14C4 D | 0.0001 M TT16C4 D | Example 3 0.0001 M HDDNS + 0.0001 M TT14C4 D | Example 4 0.0001 M HDDNS + 0.0001 M TT16C4 D |
| 0.075 | 0.16 | <0.001 | <0.001 | 38 | 46 |
| 0.30 | 0.056 | " | " | 11 | 15 |

TABLE 2-continued

| | Solvent Extraction of $Ag^+$ Ion* | | | | |
|---|---|---|---|---|---|
| Initial HDDNS Aqueous Conc. TT16C4 [H2SO4] | 0.0001 $\underline{M}$ HDDNS D | 0.0001 $\underline{M}$ TT14C4 D | 0.0001 $\underline{M}$ TT16C4 D | Example 3 0.0001 $\underline{M}$ HDDNS + 0.0001 $\underline{M}$ TT14C4 D | Example 4 0.0001 $\underline{M}$ HDDNS + 0.0001 $\underline{M}$ TT16C4 D |
| 3.0 | 0.003 | " | " | 0.37 | 1.0 |

*Conditions: 15–30 min. equilibration time; 1:1 phase ratio; room temperature; trace $Ag^+$ ion level

EXAMPLE 2

To demonstrate the selectivity of the sample solutions for copper over other metals the same procedures and solvents were used. However, other trace metals were tested in the initial aqueous sulphuric acid which was at a concentration of 0.3M. As can be seen by Table 3 below, ions $Mn^{2+}$, $Fe^{3+}$, $Fe^{2+}$, $Co^{2+}$, $Ni^{2+}$, and $Zn^{2+}$ can be easily rejected while $Cu^{2+}$ is extracted. Iron as $Fe^{3+}$, is the most difficult to separate from $Cu^{2+}$ however its distribution was still significantly lower from that of $Cu^{2+}$.

TABLE 3

| | Solvent Extraction of Mn, Fe, Co, Ni, Cu, and Zn* | | |
|---|---|---|---|
| Metal Ion | 0.01 $\underline{M}$ HDDNS D | Example 1 0.10 $\underline{M}$ HDDNS + 0.05 $\underline{M}$ TT14C4 D | Example 2 0.10 $\underline{M}$ HDDNS + 0.05 $\underline{M}$ TT16C4 D |
| $Mn^{2+}$ | 1.1 | 1.1 | 1.1 |
| $Fe^{2+}$ | 1.5 | 1.5 | — |
| $Fe^{3+}$ | 2.8 | 3.2 | — |
| $Co^{2+}$ | 1.2 | 1.2 | 1.2 |
| $Ni^{2+}$ | 1.3 | 1.3 | 1.3 |
| $Cu^{2+}$ | 1.3 | 960 | 13 |
| $Zn^{2+}$ | 1.2 | 1.2 | 1.2 |

*Conditions: Same as Tables 1 and 2 except trace metals of the different ions were used and this initial aqueous $H_2SO_4$ concentration was 0.3 $\underline{M}$.
The selective extractions of copper and silver ions have been demonstrated by the Examples. Applicants predict that gold, in the same chemical group, will also be extracted, which by its value makes the process of the invention of interest.

We claim:

1. A process for selectively extracting copper and silver from aqueous solution comprising:
   contacting said aqueous solution containing copper and silver with an organic solvent mixture of a first organic reagent and a second organic reagent, said first reagent being a tetrathiamacrocycle and said second organic reagent being an organic acid that will exchange a proton for metal cations corresponding to metals of said aqueous solution, said organic acid having a sufficient molecular weight of about 300 or more so that neither its salts nor its adducts will crystallize, resulting in a metal complex with said organic reagents that is soluble in a resulting organic phase but not in a resulting aqueous phase;
   separating said organic phase from said aqueous phase; and
   dissociating said copper and silver from said organic phase.

2. The process of claim 1 wherein said tetrathiamacrocycle is selected from the group alkyl-substituted, aryl-substituted and a combination of alkyl- and aryl-substituted tetrathiamacrocycles and said organic acid is a branched organosulfonic acid.

3. The process of claim 2 wherein said first solvent is selected from the group 1,5,9,13-tetrathiacyclohexaecane and 1,4,8,11-tetrathiacyclotetradecane and said second solvent is didodecylnaphthalene sulfonic acid.

* * * * *